United States Patent [19]

Houchens et al.

[11] Patent Number: 4,503,311

[45] Date of Patent: Mar. 5, 1985

[54] METHOD AND APPARATUS FOR DETECTING THE ONSET OF MELTING IN A RESISTANCE SPOT WELD

[75] Inventors: Albert F. Houchens, Rochester, Mich.; Basil A. Decina, Jr., McLean, Va.; James R. Havens, Sterling Heights, Mich.; Dixon Cleveland, Vienna, Va.; Gregory L. Nagel, Royal Oak, Mich.

[73] Assignee: General Motors Corporation, Detroit, Mich.

[21] Appl. No.: 498,063

[22] Filed: May 25, 1983

[51] Int. Cl.³ .............................................. B23K 11/36
[52] U.S. Cl. .................................. 219/109; 219/110; 219/117.1
[58] Field of Search ............. 219/110, 109, 108, 117.1

[56] References Cited
U.S. PATENT DOCUMENTS

4,302,653 11/1981 Denning et al. .................... 219/110

Primary Examiner—Clifford C. Shaw
Attorney, Agent, or Firm—Warren D. Hill

[57] ABSTRACT

During a weld period the weld parameters are monitored and data representing the weld resistance curve and the power curve are acquired and stored for analysis by a suitably programmed computer. The derivative of R, Ṙ is calculated and stored and the function is divided by power P to obtain Ṙ/P. The resistance curve is searched to obtain the maximum value $R_m$ which occurs during the heating phase and the function Ṙ/P is searched prior to the time of $R_m$ to find the maximum of that curve representing the highest rate of resistance increase. Then the Ṙ/P curve is searched subsequent to its maximum to determine when the function reaches a specified percentage of the maximum. That value occurs at the knee of the resistance curve and approximates the onset of melting in the weld. A prediction of whether a weld is a nugget or a sticker is made by calculating the ratio of weld energy after the onset of melting to the total weld energy, the ratio of the resistance drop after the resistance peak to the peak resistance, and then a weighted sum of the energy ratio and resistance drop ratio. An edge weld geometry is detected by calculating from the resistance and power curves the weld energy during the period of expulsion, if any, divided by the cumulative energy between the onset of melting and the end of expulsion, a measure of expulsion intensity based on the maximum degree of resistance inflection, and then a weighted sum of the energy value and the inflection value.

6 Claims, 23 Drawing Figures

TYPICAL RESISTANCE CURVE

Fig. 1 TYPICAL RESISTANCE CURVE

METHOD AND APPARATUS FOR DETECTING THE ONSET OF MELTING IN A RESISTANCE SPOT WELD

This invention relates to a method and apparatus for analysis of a resistance spot weld and more particularly for the determination of a statistically significant event in the weld resistance curve.

To assure the integrity of spot welded parts it is often the practice to improve weld gravity by analyzing welds as they are being made to assist in the proper set up of welding equipment, to utilize ongoing weld analysis throughout the production of welded parts and even to use the weld analysis as a feedback control to the welding equipment for adjusting the applied weld heat or selecting the optimum weld termination for each weld. In the design of such systems it has long been recognized that the weld resistance curve is a useful parameter to monitor for determining the progress of a weld particularly the growth of a weld nugget. Typically during the weld heating phase the resistance curve reaches a maximum and then falls off. The degree of resistance drop has been utilized as a valuable indicator of nugget growth and as a control for the termination of weld. This weld analysis technique and kindred techniques have led to improvements in weld integrity as compared with non-monitored welds. However, due to the many variables encountered in welding conditions, a high percentage of good welds has not been obtained on a regular basis. To compensate for the uncertainty of weld integrity there is a tendency to apply extra welds to a part. This is not only expensive but some parts do not lend themselves to this practice. A given welder may encounter many variables in a single application. Electrode wear or deformation is always a factor to contend with and since a given welder may be used on different regions of a given assembly, it may encounter different kinds of metals, metals with or without zinc coatings, different stack up thicknesses and different numbers of sheets to be welded, for example. The previously known analysis techniques were not adequate to contend with the many variable conditions.

Extensive research on the effect of various weld parameters reveals new techniques for weld analysis and control which are much more reliable as weld quality indicators than those previously known. In the development of these techniques it is found that there is a particular weld parameter which is a statistically significant feature in that it frequently recurs in weld analysis and is an important tool in determining the growth of a weld nugget and in determining whether a weld occurs at the edge of a part being welded. Weld analysis making use of this tool permits the prediction of weld quality to a much higher degree of certainty than was heretofore possible.

It is, therefore, an object of this invention to provide a method and apparatus which determines the knee of the weld resistance curve to serve as a spot weld analysis tool. It is a further object of the invention to provide such a tool which is useful in methods and apparatuses for welding research and for the prediction of weld quality for quality control purposes as well as for weld control purposes.

The invention is carried out by the method of measuring the weld resistance at many points during the formation of the weld, storing those resistance values, calculating a rate of change of resistance curve from the stored resistance values, locating the maximum rate of change of resistance occuring prior to the resistance peak and locating the time subsequent to the maximum rate of change that the rate of change curve reaches a specified fraction of its maximum, which time occurs at the knee of the resistance curve which approximates the onset of melting. The invention is further carried out by a computer based system for acquiring the data and including a computer programmed to carry out the above mentioned steps of weld analysis to determine the time at which the resistance curve knee occurs.

The subsequent description sets forth the invention and illustrates the utility of the invention by showing its usage in two weld quality predictor techniques.

The above and other advantages of the invention will become more apparent from the following description along with the accompanying drawings wherein.

THE INPUT VARIABLES

Figure 1:
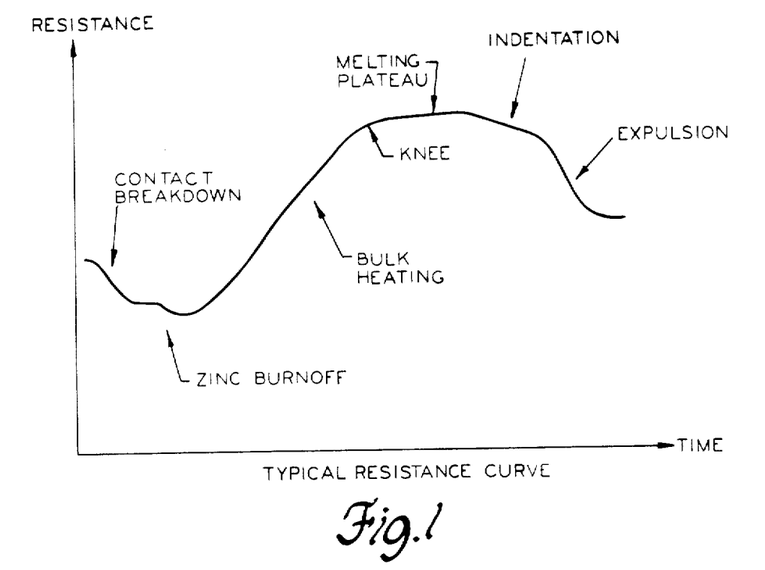
FIG. 1 is a graph of a typical weld resistance curve.

The fundamental concept underlying the analysis technique is that the growth of a weld may be tracked with considerable consistency by observing the time histories of the electrical resistance $R(t)$ of the weld, the electrical power $P(t)$ put into the weld, and the cumulative heating energy $E(t)$. FIG. 1 shows a typical R-curve and the aspects of the weld growth which can be monitored from the curve.

Though resistance, power and energy cannot be measured directly, they are derived from the tip voltage $v(t)$ and primary current $i(t)$ which are sensed directly. The preferred procedure for calculating the resistance from continuously sampled measurements on voltage and current is the following least-means-squares approach. The welder circuit is modeled as a series inductance and resistance, and the voltage is therefore expressed as:

$$v = Ri + Ldi/dt + C$$

where v = voltage
i = current
di/dt = current rate of change
R = resistance
L = inductance
C = combination of voltage and current sensor offsets The average value of resistance is computed at each half cycle by performing a least-mean-square regression analysis of i onto v in the above equation. The input values for v and i are obtained by the periodic sampling of the voltage and current sensors, and di/dt is computed by time differencing the current samples. The regression analysis produces values for R, L and C at each half cycle.

The power is given by:

$$P(t) = R(t)i^2(t)$$

and the cumulative energy is given by:

$$E(t) = \int_0^T P(t)dt.$$

To assess weld quality it is first desired to determine whether a weld is a "nugget" or a "sticker". A nugget is a sound weld wherein two or more sheets are thoroughly fused together, and a sticker is a weak weld having a superficial or surfacing joining. A nugget/sticker model is used to distinguish between the two welds. Input values to the system are the weld resistance curve and power curve, or voltage and current data from which the curves are computed. A key feature to be identified is the knee of the resistance curve which roughly corresponds to the onset of melting, or the beginning of nugget formation. The nugget/sticker model uses the ratio of weld energy after the onset of melting to total weld energy as the primary nugget/sticker discriminant, although the percentage resistance drop from the resistance peak is also utilized. Some of the welds thus identified as nuggets may occur at the edge of a sheet and are undesirable because of insufficient strength or because of aesthetic considerations. An interior/edge model is used to discriminate between these conditions. The resistance curve is analyzed to determine whether expulsion of molten metal from the weld occurs. If not, the weld is interior. If there is expulsion, the resistance curve reveals when the expulsion occurs and its intensity. The ratio of weld energy during expulsion to weld energy between the onset of melting and the end of expulsion is a primary edge weld indicator although the expulsion intensity is also significant.

APPARATUS

Figure 2:
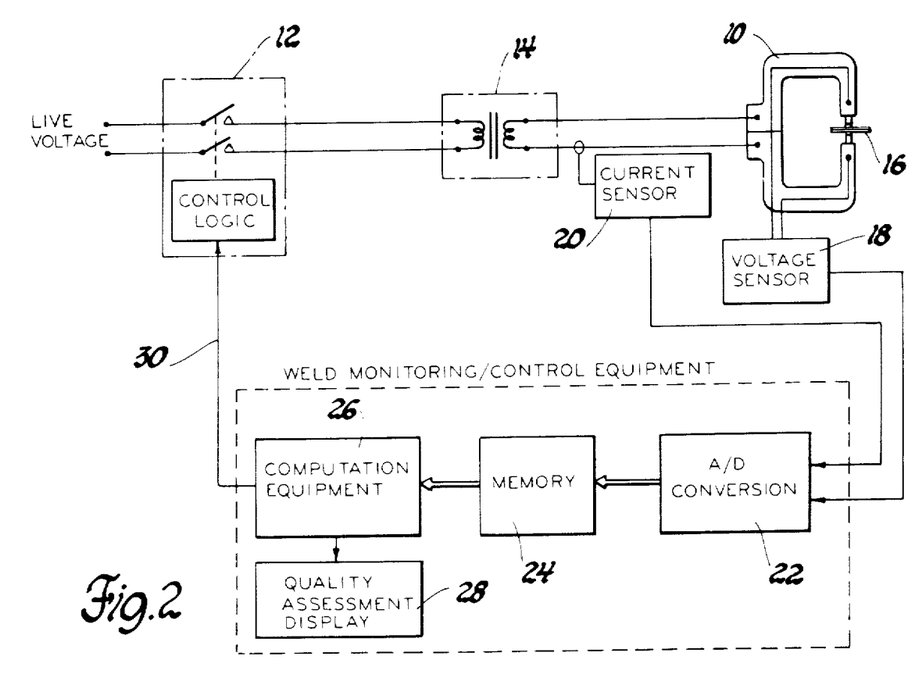
FIG. 2 is a diagram of a welding system with weld monitoring apparatus according to the invention.

FIG. 2 shows apparatus to monitor and/or control a spot welder 10. A controller 12 coupled to the welder by a transformer 14 supplies weld current and voltage to steel sheets 16 being welded. Voltage and current sensors 18 and 20 respectively produce analog signals proportional to the welder voltage and current. It is preferred that the voltage sensor leads be placed as close as possible to the welder electrodes (to eliminate the measurement of voltage due to distributed resistance in the gun arm and secondary cables); however, this is not a requirement for satisfactory operation of the monitor/controller. The current sensor may be placed anywhere in either the primary, or secondary circuits of the welder.

Due to the complexity of the computational procedures required to calculate the quality assessment, the welder control signal, and edge discrimination, it is preferred that the monitoring/control apparatus be implemented with digital computation equipment, although alternative computation means may be used to perform the same procedures. Analog-to-digital conversion means 22 sample the voltage and current signals and convert the signals to discrete time waveforms which are stored in the system memory 24. The computational equipment 26 operates on the waveform data to produce the quality and edge assessments, which may be displayed at readout device 28 and/or transmitted to supervisory systems (not shown) and the welder shut-off control signal which is transmitted to the welder control logic via feedback line 30. A Digital Equipment Corporation VAX 11/780 computer with the VMS 3.0 operating system is used to carry out the computations. The computer is programmed according to the program given below which is written in Fortran 77. Alternatively a Motorola 68000 microprocessor based system using a VERSAdos operating system for real time use is programmed with logically equivalent software.

Figure 3:
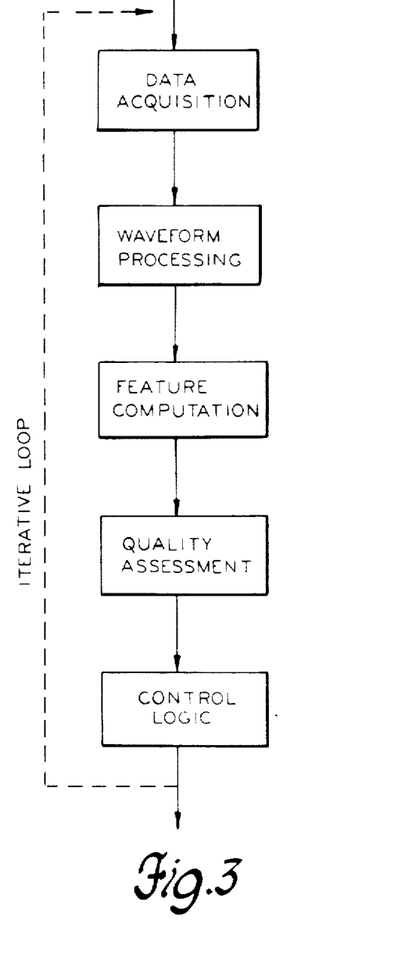
FIG. 3 is a flow chart of software procedures used for weld monitoring.

The preferred software procedures for computing the weld quality and determining when to shut the welder off are shown in FIG. 3. The procedure involves an iterative loop whereby data is collected and processed continually as the weld is made. The iteration period is not critical, though it should generally be less than 10% of the average weld time so that the control logic may achieve moderately fine control. For alternating-current welders, it is convenient to execute the loop at half-cycles or full-cycle intervals. For directcurrent welders, the iteration period need not be synchronized to welder power.

The data acquisition function digitizes and stores the current and voltage data. The waveform processing function computes the resistance, power and energy curves. The feature computation function searches for the start of melting and computes the percent energy after melting, the percent R-drop and the expulsion energies. The quality assessment logic computes the quality discriminant and the edge discriminant. The optional control logic issues a shut-off command to the welder controller when the quality discriminant function has gotten above the good-weld threshold by a certain percentage.

DETERMINING THE ONSET OF MELTING

Statistical analysis of many test welds has shown that the time at which the knee of the resistance curve occurs is highly significant. The physical interpretation of this identifying marker is that it generally corresponds to the onset of melting.

Figure 4:
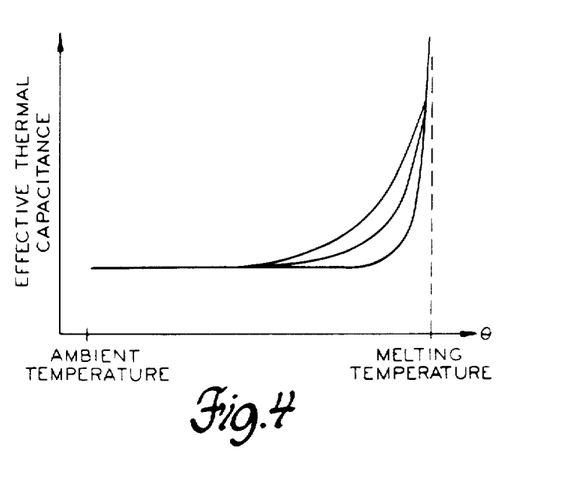
FIG. 4 is a graph of effective thermal capacitance of the weld volume vs. temperature.

The procedure for identifying the time that melting begins in a weld is based upon a combination of the following three physical principles:

a. The average temperature $\theta$ of the weld increases as electrical power P is put into the weld:

$$\frac{d\theta}{dt} = \frac{P}{mk_1(\theta)} \tag{1}$$

where m is the mass of the weld and $k_1(\theta)$ is the specific heat of the material being welded (joules/deg/gm). The mass of the weld is given approximately by:

$$m = \rho dA \tag{2}$$

where $\rho$ is the density (gm/cm$^3$) of the material being welded and d and A are the dimensions of the weld volume. A is taken to be the cross sectional area of the electrode tips and d is the thickness of the stackup.

b. Due to latent heat of fusion, the specific heat $k_1(\theta)$, which is relatively constant for low temperatures, increases rapidly between the solidus and liquidus temperatures. This produces a rapid increase in the effective thermal capacitance of the weld zone. Typical schematic plots of effective thermal capacitance vs $\theta$ are shown in FIG. 4. Because the spatial profile of the temperature is not constant throughout the weld volume, plots of the effective thermal capacitance as a function of average temperature vary somewhat from weld to weld.

c. The electrical resistance R of the material increases approximately linearly as the weld temperature increases:

$$(dR/d\theta) = k_2 k_3 \qquad (3)$$

where $k_2$ (ohm·cm$^2$/cm/deg) is the material's thermal coefficient of electrical conductivity and $k_3$ (cm/cm$^2$) is the weld geometry constant which relates the stackup geometry and the intrinsic material resistance to form the aggregate resistance of the weld. The geometry constant $k_3$ for the resistance is given approximately by:

$$k_3 = (d/A) \qquad (4)$$

The effects of electrode and interfacial contact resistance are not included; it is assumed that contact resistance is negligible during the period when this equation is applied.

Combining equations 1, 2, 3 and 4 yields an expression by which a term inversely proportional to the specific heat of the weld may be computed from the measurable parameters resistance and power. First equation 1 and 2 are multiplied to obtain:

$$\frac{d\theta}{dt} \cdot \frac{dR}{d\theta} = \frac{P}{m \, k_1(\theta)} k_2 k_3 \qquad (5)$$

Note that the $d\theta$'s cancel in equation 5, implying that temperature does not need to be measured explicitly to extract information about the specific heat.

$$\frac{dR}{dt} = \dot{R} = \frac{P}{m \, k_1(\theta)} k_2 k_3 \qquad (6)$$

Next, the stackup property equations 2 and 4 for the weld mass and resistance geometry are substituted into equation 6 to yield:

$$\dot{R} = \frac{P}{\rho \, d \, A \, k_1(\theta)} k_2 \frac{d}{A} \qquad (7)$$

Cancelling the distance d and dividing through by the power P gives the inverse specific heat in terms of the resistance rate and electrical power:

$$\dot{R}/P = \frac{k_2}{\rho \, A^2 \, k_1(\theta)} \qquad (8)$$

The left hand portion of equation 8 is computed at each half cycle during the weld to obtain a time history of inverse specific heat. (The inverse form is computed to maintain mathematical stability of the R/P ratio. P is always positive but R may be zero or negative.) For welds where the power setting is constant throughout the weld, the value of P may be taken to be constant, and the division by P is not required. In this case, processing is performed directly on the R curve.

When the specific heat begins to rise, the R/P curve drops correspondingly. The time that melting begins is detected by analyzing the drop in the R/P curve. For the present weld monitoring algorithm, a threshold of 25% of the peak value of R/P was found empirically to give good weld quality prediction. Thus melting is assumed to begin when the R/P curve drops from its peak during bulk heating to a value of 25% of that peak.

The specific values of $\rho$, A and $k_2$, and the value of $k_1$ at low temperatures, need not be known to detect the onset of melting. As long as $\rho$, A and $k_2$ do not vary significantly with respect to the variation in $k_1(\theta)$, all that must be observed is a relative drop in the R/P curve indicating the transition in specific heat.

In the original R curve, FIG. 1, the commencement of melting is seen as a transition from the bulk heating rise to the melting plateau, and this point is referred to as the knee of the curve.

Figure 5A:
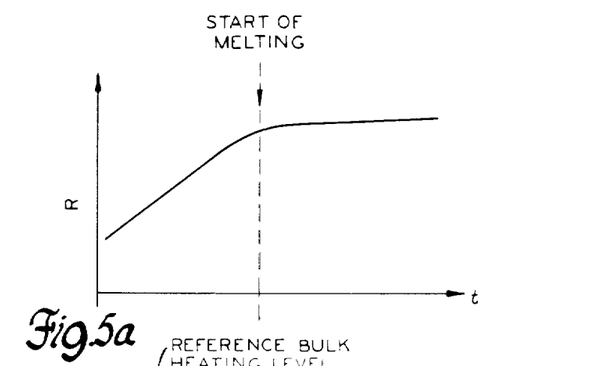
FIGS. 5a and 5b are idealized curves for weld resistance and rate of resistance change.
Figure 5B:
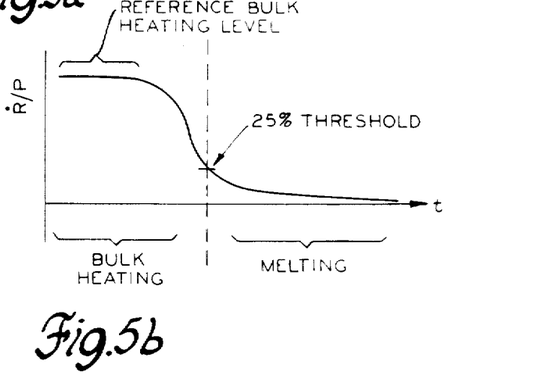

Given that the three physical phenomena above were the only ones which impacted the behavior of the resistance curve throughout the history of a weld, a typical R curve would consist, as illustrated in FIG. 5a, only of a rise followed by a flattening after the start of melting. The search for the melting time would then consist of establishing a bulk-heating reference level for R/P shown in FIG. 5b during the first several weld cycles and then looking for a drop to 25% of that level.

Figure 6A:
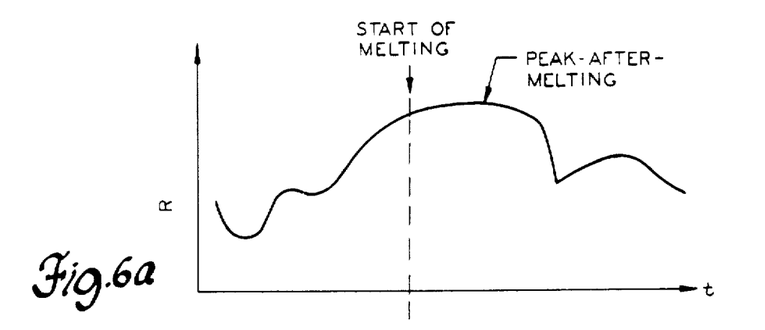
FIGS. 6a and 6b are representative curves for weld resistance and rate of resistance change.
Figure 6B:
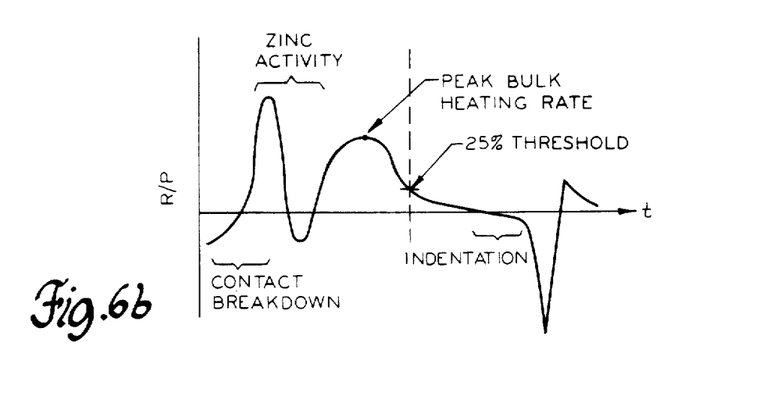

In fact, however, as illustrated in FIGS. 6a and 6B, several other phenomena may occur which significantly modify the behavior of the R and R/P curves. Before melting starts, the effects of contact resistance breakdown at the beginning of the weld generally overshadow the effects of bulk heating, so R starts out negative. If the steel is galvanized, the melting and vaporization of zinc, first between the steel sheets and later on between the electrodes and the sheets, superimposes "disturbances" on the R curve which appear as oscillations on the R/P curve. After melting starts, indentation and expulsion result in drops in the R curve which cause R/P to go negative. The R curves may also rise significantly after explusion. Additionally, the cool times in multipulse welds introduce discontinuities in the R and R/P curves, and no information on these curves is available during the cool times. The search for the start of melting must contain logic to isolate the bulk heating and melting phenomenon from the effects of contact breakdown, zinc coating related oscillations, indentation, expulsion and cool times.

Figure 7:
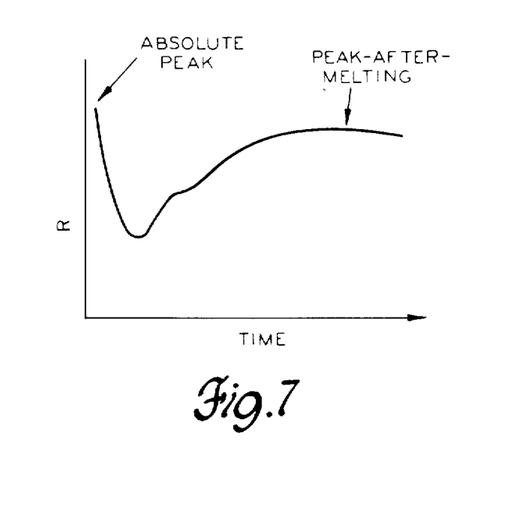
FIG. 7 is a weld resistance curve illustrating the effect of high initial contact resistance.
Figure 8:
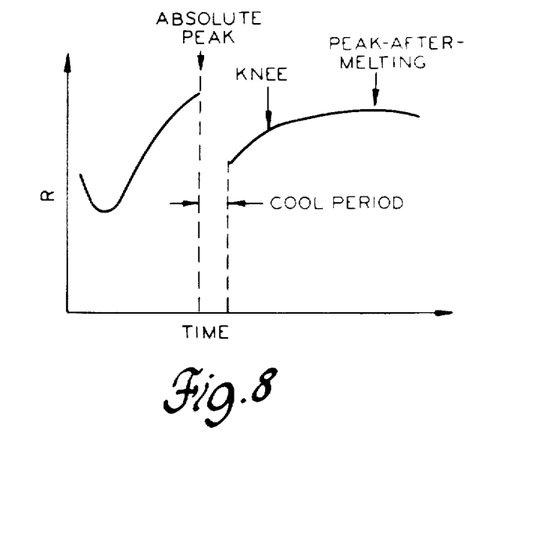
FIG. 8 is a weld resistance curve illustrating the effect of cool time interruption.

The present procedure for locating the start of melting consists of three major steps. First a search is performed on the R curve to identify the resistance peak-after-melting. With some key exceptions discussed below, this peak is generally the maximum point on the R curve. It occurs after the onset of melting but prior to any identation or expulsion. The purpose of locating this peak is to remove the effects of indentation and expulsion from the R/P curve by placing an upper limit on the search regions for the peak bulk heating rate and for the time of melting. A global search is done throughout the R curve to find the peak. For most welds, the maximum value of the R curve occurs between the melting and indentation phases, and a simple peak detection routine is sufficient to locate the point. There are two important welding conditions, illustrated in FIGS. 7 and 8, which can generate peaks in the R curve that are higher than the peak-after-melting, and the peak detection algorithm must accommodate these phenomena:

1. In welds with low heat in the early half cycles (i.e., welds with upslope or low heat first pulses) the initial contact resistance may be higher than the peak-after-melting. See FIG. 7.
2. In some multi-pulse welds where a cool period begins when the weld is late into bulk heating but the peak-after-melting does not occur until the next pulse, the peak-after melting may not get as high as the resistance value at the end of the prior peak. See FIG. 8.

The procedure to locate the resistance peak consists generally of a search through the R curve for the absolute maximum value of R. Additionally, the following checks are designed into the peak detection algorithm to reject the location of resistance maxima resulting from the phenomena described above.

1. To prevent the false detection of contact breakdown peaks, the peak search routine skips the initial points on the R curve if the curve starts out moving downward. Only when the resistance rate first goes positive does the search begin.
2. If the maximum value of R occurs at the end of a pulse, and R is still rising at the end of the pulse, it is assumed that the peak-after-melting has not yet occurred. This peak is ignored, and, assuming there are additional heat pulses, a new search for another peak is initiated at the beginning of the next pulse. The search region is continually reduced as long as the maximum values occur at the end of a heating pulse.

The second major step of the procedure is establishing the peak bulk heating rate. The peak bulk heating rate is taken to be the local maximum point on the R/P curve just prior to the peak in the R curve. This avoids a peak caused by zinc activity as shown in FIG. 6b. Specifically the search finds the global R/P peak between the beginning of the weld and the peak after melting. Next, the search proceeds backward, beginning at the time of the peak-after-melting and terminating at the global peak, searching for a local peak which is more likely than the global peak to represent the true bulk heating rate. A local peak is taken to be the peak bulk heating rate if (a) its value is at least a given percentage (50% is recommended) of the global peak value, and (b) there is a local minimum between the global and local peaks which is less than a given percentage (80% is recommended) of the local peak value. The first local peak meeting this criteria is taken to be the true peak bulk heating rate. If no local peak meets the above criteria, the global peak is taken to be the peak bulk heating rate.

The third major step is locating the onset of melting by searching the R/P curve, beginning at the time of the peak bulk heating rate, for the point where the curve drops to a specified percentage of the peak bulk heating rate. In practice a threshold of 25% of R/P max provides a reliable knee indicator but that threshold value is not critical. For example, if 50% of R/P max is used, the time-of-knee changes only a small amount.

Figure 9:
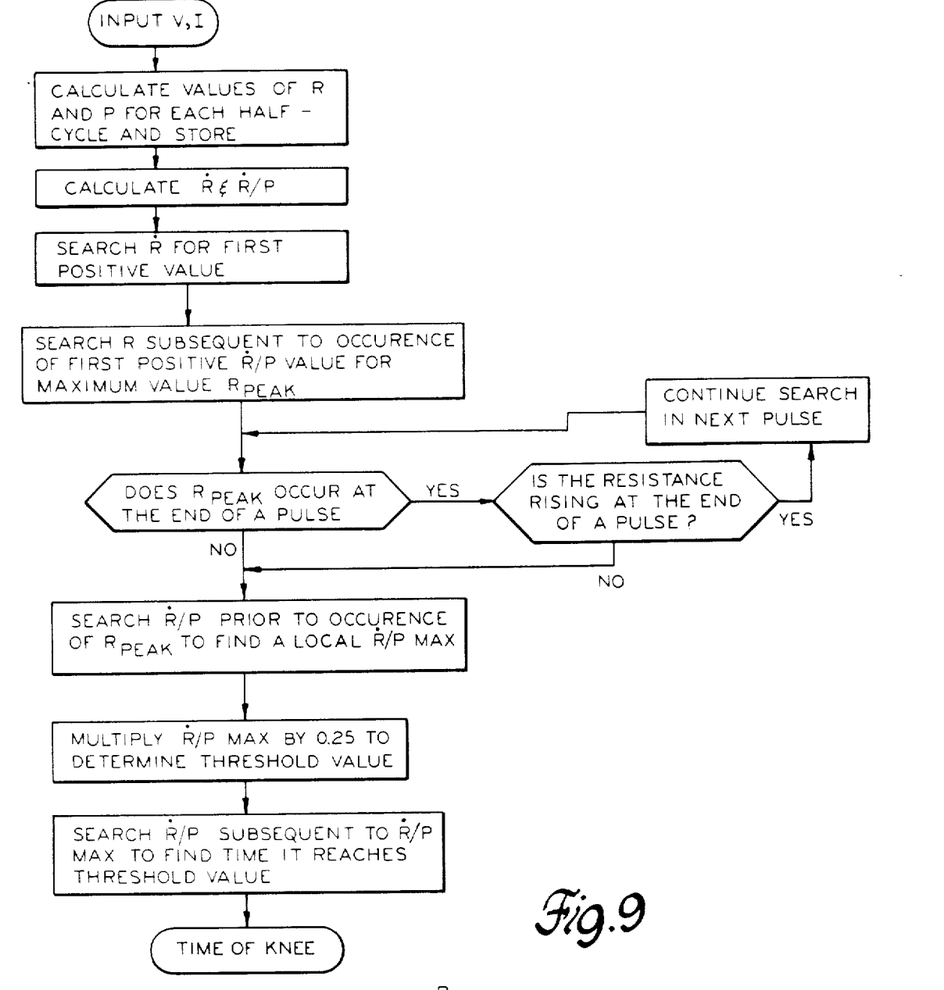
FIG. 9 is a flow chart of a computer program for detecting the onset of melting.

The routine for identifying the time-of-knee or onset of melting is summarized in the flowchart of FIG. 9.

THE NUGGET/STICKER MODEL

A weld is predicted to be a nugget if it is observed to progress sufficiently far through its metallurgical growth by the time that heating is terminated. Conversely, it is predicted to be a sticker if insufficient growth is observed. The model does not monitor the solidification of the nugget after the heating period. The model therefore assumes implicitly that there is sufficient hold time for the nugget to complete the solidification process before the electrode pressure is released.

The degree of weld growth is defined by two features. The first feature, %E, is the percentage of the total weld energy that is put into the weld after melting has begun.

The cumulative energy required to get the weld to the beginning of melting is defined to be the reference energy $E_M$ for the weld. The absolute amount of energy required to get to the beginning of melting, or to get to the point of making a nugget, varies considerably as a function of material type, stackup geometry, electrode tip condition, electrode force, and welder heat profiles; however, it has been found empirically that a weld will generally be a nugget if the total energy $E_T$ put into the weld exceeds the melting energy $E_M$ by a given percentage. The following ratio feature is computed by dividing the energy after melting by the total energy in the weld:

$$\%E = \frac{E_T - E_M}{E_T}.$$

%E has proven empirically to be a fairly robust feature in that it varies directly with weld quality, but its value is influenced little by variations in conditions such as material, stackup thickness, tip condition, force, and heat profiles.

The %E feature has the added advantage that it is unitless. Miscalibrations in the voltage or current sensors will not effect the feature values because the calibration constants in the numerator and denominator cancel. The %E feature alone can be the basis of weld quality assessment, however, the accuracy of the model can be improved by incorporating a second feature.

The second feature, $\%R_{drop}$, is the percentage drop of the peak of the R curve relative to R peak. Empirical evidence shows a small but significant set of nugget welds which do no exceed the %E threshold but which do show some evidence of indentation in the R curve. This evidence of indentation is an indication that the weld is actually further along in its growth than indicated by the %E feature alone.

A gradual drop in the R curve after the bulk heating rise is generally interpreted as indentation of the welder electrodes into the metal. As the electrodes indent and the distance across the sheets reduces, there is less material impeding current flow, and the resistance drops. Computation of the $\%R_{drop}$ feature first involves the location of the resistance peak after the bulk heating rise. The resistance differential between the peak and the lowest point on the R curve subsequent to the peak is the $R_{drop}$. The normalized $\%R_{drop}$ feature is the ratio of the drop to the peak value:

$$\%R_{drop} = \frac{R_{drop}}{R_{peak}} \text{ (for single pulse welds).}$$

(for single pulse welds).

As is the %E feature, %R$_{drop}$ is unitless, and its value does not depend on precise sensor calibration. Here the multiplier 100 for computing percentage has been omitted in the %E and %R definitions but are accounted for effectively in the model coefficients given below.

The above definition is adequate for single pulse welds. In multipulse welds, however, there are generally significant drops in the resistance during the cool times. Because these drops are not attributable to indentation, the R$_{drop}$ routine contains logic to ignore drops due to interpulse cooling.

Figure 10:
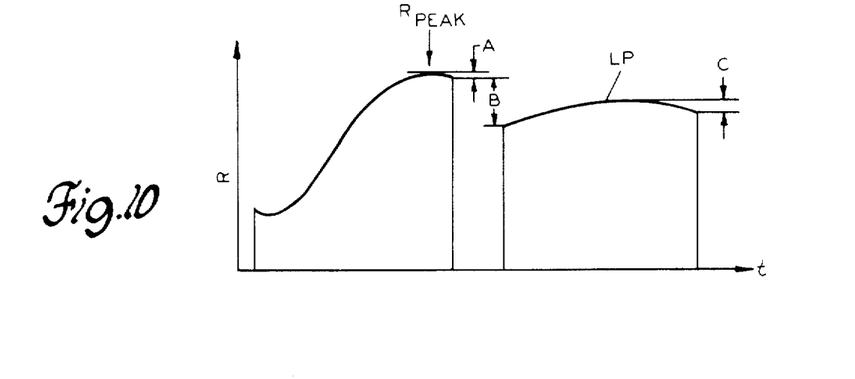
FIG. 10 is a weld resistance curve illustrating the R drop determination for multipulse welds.

FIG. 10 illustrates resistance drop during the cool time. In this example, the resistance peak-after-melting occurs in the first heat pulse. Some drop designated A in the figure, occurs during the first pulse and presumably results from indentation. The drop B, however, results primarily from cooling of the metal, although there may in fact be some continued indentation during the cool time.

After repeated bulk heating in the second pulse, a new local peak LP is achieved and the drop C is evidence of additional indentation. The %R$_{drop}$ feature is taken to be the sum of A plus C divided by R$_{peak}$.

The percent R$_{drop}$ routine takes as its inputs the position and value of R$_{peak}$. Separate resistance drops are then computed for each heat pulse beginning with the one containing the peak-after-melting. For the pulse containing the peak, the R$_{drop}$ is taken to be the difference between the peak value and the lowest point on the R curve subsequent to the peak but within the pulse.

For each subsequent heating pulse, a search is performed to find the maximum resistance within the peak. The R$_{drop}$ for that pulse is taken to be the difference between the peak and the lowest value of R within the pulse after the peak.

The total %R$_{drop}$ for the weld is the sum of the individual drops divided by the peak after melting:

$$\% R_{drop} = \frac{\sum_{peak\ pulse}^{end} R_{drop}(pulse)}{R_{peak}} \text{ (for multi-pulse welds)}$$

A discriminant metric y is defined to be a weighted sum of the energy and R$_{drop}$ features:

$$y = A_0 + A_1 \% E + A_2 \% R_{drop}$$

A$_o$ is a constant, A$_1$ and A$_2$ are the model coefficients and are derived empirically from the test data. The model output y is unitless. Useful coefficients for successful weld prediction have been determined to be A$_o$= −0.53, A$_1$=1 and A$_2$=7.5. If y is greater than zero, it is predicted that there is sufficient growth of the weld to call it a nugget. Conversely, negative values of y imply a sticker.

The model coefficients A$_1$ and A$_2$ represent the amounts of energy or R$_{drop}$ that must be achieved by a weld to be called a nugget. Mathematically, either the energy or R$_{drop}$ may be sufficient by itself to justify a nugget call, but in practice there is never any R$_{drop}$ without some %E. A combination of energy and R$_{drop}$ may be sufficient for a nugget call though the energy may not be adequate by itself.

Figure 11:
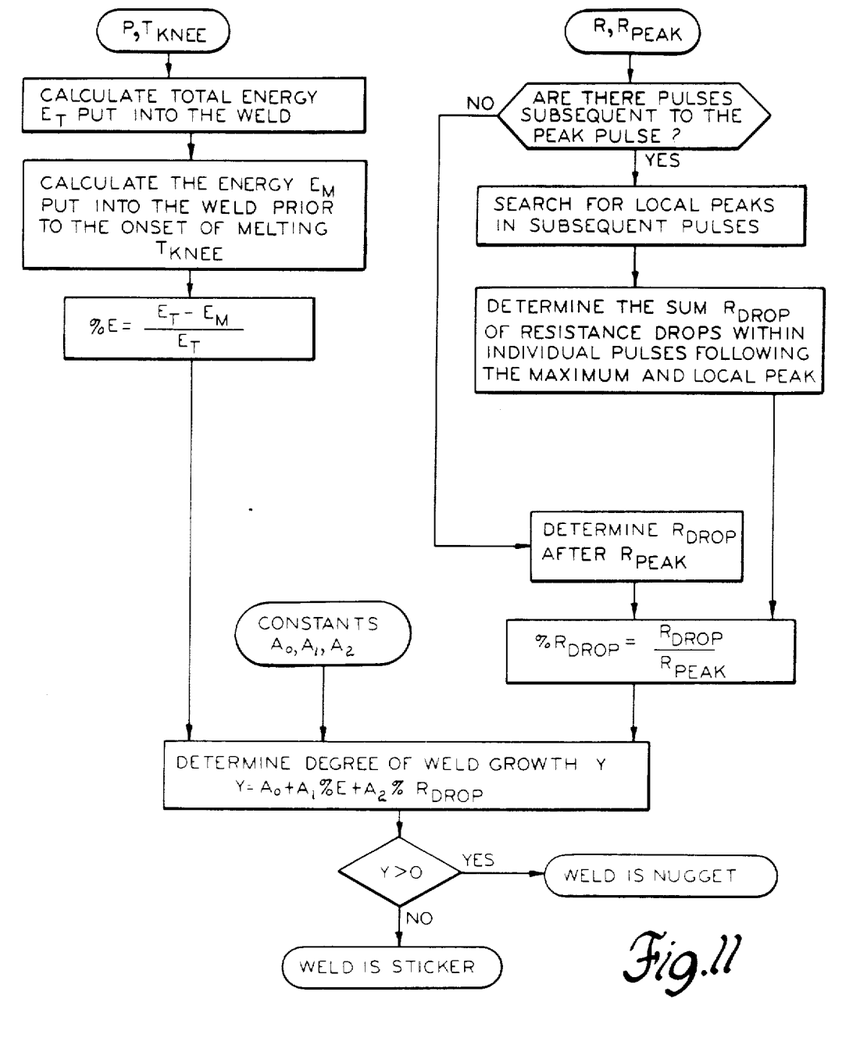
FIG. 11 is a flow chart of a computer program for making a nugget/sticker prediction.

The routine for executing the nugget/sticker model is summarized in the flowchart of FIG. 11.

EDGE DETECTION

Figure 12A:
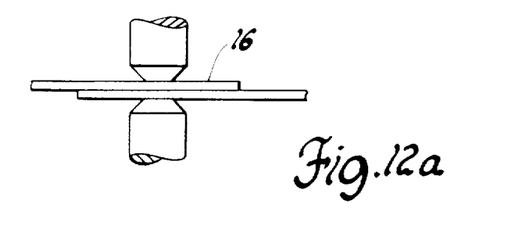
FIGS. 12a, 12b and 12c are electrode placement diagrams showing interior and edge weld geometries.
Figure 12B:
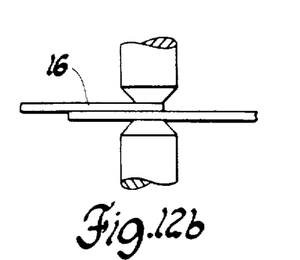
Figure 12C:
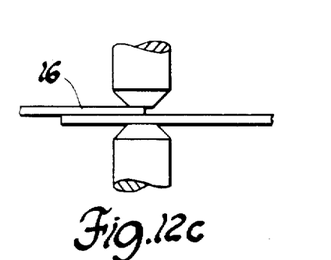

For this description constant power weld setting is assumed. Thus R is utilized rather than R/P. Of course the power normalization should be utilized where a variable power weld schedule is used. One geometric feature of a weld that may be inferred by observation of the R curve is the location of the electrode tips with respect to the edge of one of the metal sheets being welded. FIG. 12 illustrates three interior vs. edge conditions: (a) an interior condition, where the electrode tips are well inboard of the metal edge, (b) a zero overlap edge condition where one of the tips is fully on the sheet but the edge of the tip is at the edge of the sheet, and (c) a high overlap edge condition where the electrode overlaps the edge of the sheet by approximately 50%.

The procedure presented here to discriminate between edge and interior welds is based upon the observation that the two types of welds expel differently. When (and if) interior welds expel, they generally do so well after melting begins (indicated by the knee of the R curve), and they do so violently. Prior to expulsion, the pool of molten metal is contained by the surrounding solid material. During this time, the R curve remains high even though there may be some small R drop due to electrode tip indentation. When the surrounding solid can no longer contain the pool of molten metal, the weld expels. At this time, the pool squirts out within one or two half cycles causing a violent step-like drop in the R curve.

By comparison to interior welds, edge welds expel more gently. When the electrode overlaps the edge of one of the metal sheets, melting occurs at this edge, and there is no solid metal at the edge to contain the molten metal. The molten metal escapes, i.e., expels, continuously as it melts. The R curve therefore begins to drop as soon as the melting begins, and this drop is generally more continuous, long term, and more gradual than the instantaneous drops observed in interior welds.

Figure 13A:
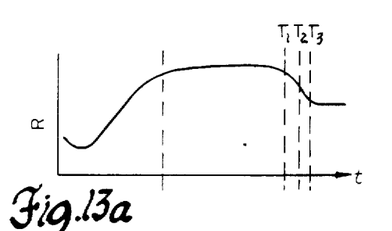
FIGS. 13a, 13b and 13c are typical weld resistance (R), R and R curves respectively for interior welds.
Figure 13B:
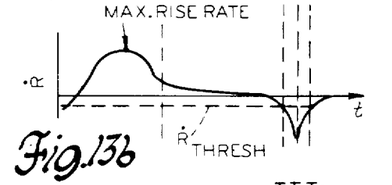
Figure 13C:
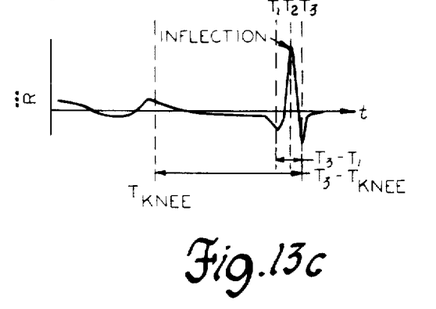

Typical examples of R curves from interior welds are shown in FIGS. 13a, 13b and 13c. The top trace FIG. 13a shows the raw resistance curve R(t). The second curve FIG. 13b is the first time derivative of R(t), the resistance rate Ṙ. The third trace FIG. 13c is the third derivative, the resistance inflection R̈.

Figure 14A:
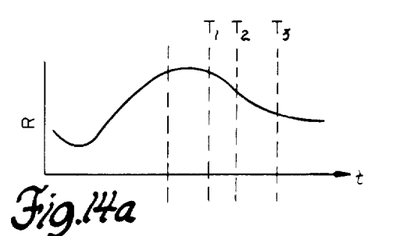
FIGS. 14a, 14b and 14c are typical weld resistance (R), R and R curves respectively for edge welds.
Figure 14B:
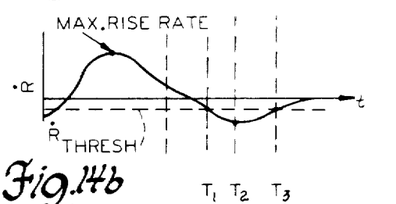
Figure 14C:
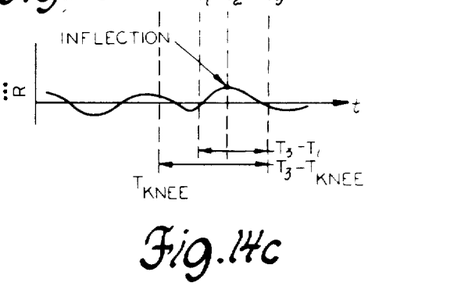

FIGS. 14a, 14b and 14c show corresponding curves for edge welds.

In order to quantify the above edge phenomenon for purposes of discriminating edge and interior conditions, four timing pointers are defined:

(1) T$_{knee}$: The time that melting begins.
(2) T$_1$: The time, after the resistance peak, where the resistance rate first drops below a threshold Ṙ$_{thresh}$. This event is intended to indicate the beginning of expulsion, i.e., the escape of molten metal. The threshold is set sufficiently negative that small resistance drops due to plastic deformation of solid metal will not trigger the event, but it is high enough that molten metal extruding from low-heat edge welds will trigger the event. (A threshold value of −0.83 micro-ohms per half cycle is adequate for 60 Hz welders operating on steel with stackup thickness between 75 and 150 mils.)
(3) T$_3$: The time, after T$_1$, where the resistance rate first rises back above the rate threshold. This event is intended to indicate the end of the first expulsion. (Multiple expulsions may occur, particularly in the multiple stackups. Typically the first expulsion results from the edge geometry and the later ones are interior expulsions between the fully overlapped sheets. To detect an edge geometry, it is necessary to isolate and evaluate the first expulsion). $T_3$ is not computed if $T_1$ does not exist. If $T_1$ exists, but the weld is terminated before the resistance rate rises back above the rate threshold, $T_3$ is taken to occur at the end of the weld.

(4) $T_2$: The time, between $T_1$ and $T_3$, where the resistance drop rate peaks, i.e., is most negative. This event is the inflection point of the resistance drop, and it is intended to indicate when the expulsion rate of molten metal is maximum.

Edge weld expulsions last a relatively long time ($T_1$ to $T_3$) with respect to interior expulsions, and they "begin" relatively much earlier ($T_{knee}$ to $T_1$) after the knee than do interior expulsions. Expressed another way, edge welds are in the process of expelling a greater percentage of the melting period between the knee and the completion of expulsion than are interior welds. See FIGS. 13 and 14. This gives rise to a candidate time feature:

$$x_T = \frac{T_3 - T_1}{T_3 - T_{knee}}$$

The normalization resulting from the ratio in this time feature renders it somewhat insensitive to the overall speed of the weld, but the existence of cool times between pulses or varying heat rate between or within pulses could offset the feature. More fundamental than how much time is taken to progress from one event to the next is how much weld energy is absorbed by the weld during this period. Thus differential energies are substituted for differential times to obtain the energy feature:

$$x_E = \frac{EE(T_1 \text{ to } T_3)}{EE(T_{knee} \text{ to } T_3)}$$

The degree of inflection, i.e., the third derivative of R at the time of the maximum drop rate, shows how "step-like" the expulsion is, so it gives an indication of how "violent" the resistance drop is. The inflection feature is defined as the third derivative of the resistance curve at the inflection point $T_2$. FIGS. 13c and 14c show the R curve for the entire weld time, however the value of R is required only for time $T_2$. It is computed by taking the second derivative of the R curve at time $T_2$. To render the feature independent of calibration scale factors on the voltage and current sensors, and to eliminate sensitivity to different rates of overall weld growth R is normalized by the maximum resistance rise rate $R_{max}$:

$$x_I = R/R_{max}$$

Thus the inflection feature $x_I$ has the units of inverse time squared.

Figure 15:
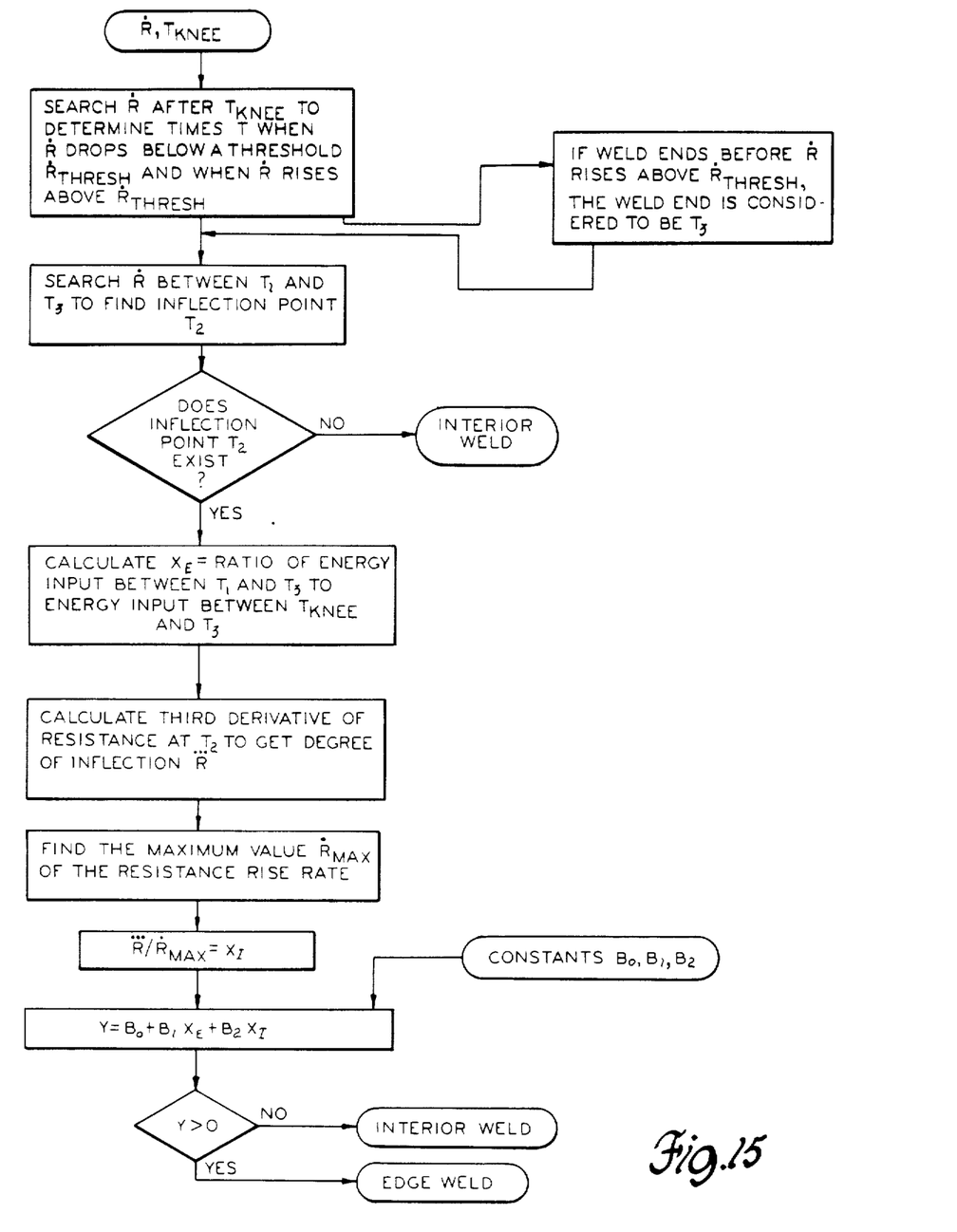
FIG. 15 is a flow chart of a computer program for making an interior/edge weld prediction.

A flowchart of the edge detection procedure is shown in FIG. 15. There are two stages in the decision process. First, if no inflection point is found to exist after the peak in the R curve, the weld is called interior. An underlying assumption here is that the weld had at least 50% of its energy after the knee. This assumption is well founded because 50% energy after the knee is generally required to make a nugget. Because edge welds generally begin expelling very soon after the knee, welds are called interior if they go to completion without an expulsion inflection.

Second, given that an inflection point has occurred, the edge/interior decision is based on a linear combination of the energy and inflection features:

$$y = B_0 + B_1 X_E + B_2 X_I$$

where $B_0$, $B_1$ and $B_2$ are coefficient values which determine the threshold for the energy and inflection features $X_E$ and $X_I$. Values of $B_0 = 1$, $B_1 = (1/0.36)$ and $B_2 = (1/1.50)$ have been found empirically to be effective for welding steel stackups with thicknesses between 75 and 150 mils.

If y is positive, the weld is called interior (i.e., good), and, if negative, the weld is called edge.

It will thus be seen that based upon the weld/nugget discrimination and the edge detection method described herein, both of which rely on the identification of the resistance curve knee, useful techniques are disclosed for assessing and/or controlling weld quality with a high degree of confidence. It will also be seen that apparatus is revealed for detecting the resistance knee and carrying out the weld analysis methods using digital computers programmed according to the disclosed routines.

The embodiments of the invention in which an exclusive property or privilege is claimed are defined as follows:

1. A method of detecting the approximate onset of melting in a resistance spot weld comprising the steps of:

monitoring the weld resistance R and the electrical power P supplied to the weld, calculating the rate of change of resistance R and dividing by power to obtain the time varying function R/P representing the inverse specific heat of the weld, searching the function R/P to locate a maximum value representing the inverse specific heat for the weld at low temperature, and searching the function R/P subsequent to its maximum to determine when it reaches an empirically determined fraction of the maximum value which occurs upon an increase of specific heat accompanying the onset of workpiece melting, thereby identifying the time of the onset of melting.

2. A method of detecting the approximate onset of melting in a resistance spot weld comprising the steps of:

monitoring the weld resistance R and the electrical power P supplied to the weld, calculating the rate of change of resistance R and dividing by power to obtain the time varying function R/P representing the inverse specific heat of the weld, searching the resistance function R subsequent to an initial increase of resistance to identify its maximum value $R_{peak}$ which occurs after the onset of melting, searching the function R/P prior to the occurrence of $R_{peak}$ to locate a maximum value representing the inverse specific heat for the weld at low temperature, and searching the function R/P subsequent to its maximum to determine when it reaches an empirically determined fraction of the maximum value which occurs upon an increase of specific heat accompanying the onset of workpiece melting, thereby identifying the time of the onset of melting.

3. A method of detecting the approximate onset of melting in a resistance spot weld made by applying a plurality of weld current pulses separated by cooling periods, comprising the steps of:

monitoring the weld resistance R and the electrical power P supplied to the weld, calculating the rate of change of resistance R and dividing by power to obtain the time varying function R/P representing the inverse specific heat of the weld, searching the resistance function R subsequent to an initial increase of resistance to identify when its maximum value $R_{peak}$ occurs, disregarding any maximum occurring at the end of a pulse if the resistance is still rising at the end of the pulse, searching the function R/P prior to the occurrence of $R_{peak}$ to locate a maximum value representing the inverse specific heat for the weld at low temperature, and searching the function R/P subsequent to its maximum to determine when it reaches an empirically determined fraction of the maximum value which occurs upon an increase of specific heat accompanying the onset of workpiece melting, thereby identifying the time of the onset of melting.

4. In a resistance spot weld process wherein the weld resistance curve increases during heating, passes through a knee, and then reaches a peak during nugget formation, the method of detecting the knee of the curve for use as a parameter in weld analysis comprising the steps of:

measuring the weld resistance, storing resistance values representing the weld resistance curve, calculating a rate of change of resistance curve from the stored resistance values, searching the rate of change curve to find the maximum rate of change of resistance just prior to the resistance peak, and searching the rate of change curve subsequent to the maximum rate of change to determine the time that it reaches a specified fraction of the said maximum, whereby that time occurs at the knee of the resistance curve.

5. Apparatus for determining when a weld resistance curve passes through a knee prior to a resistance peak during a weld heating phase, comprising:

means for acquiring data representing the weld resistance curve, and digital computer means for storing the acquired data, said computer means being programmed to:
 (a) calculate a rate of change of resistance curve from the stored resistance values,
 (b) search the rate of change curve to find the maximum rate of change of resistance just prior to the resistance peak, and
 (c) search the rate of change curve subsequent to the maximum rate of change to determine the time that it reaches a specified fraction of the said maximum, whereby that time occurs at the knee of the resistance curve.

6. Apparatus for detecting the approximate onset of melting in a resistance spot weld made by applying a plurality of weld current pulse separated by cooling periods, comprising:

means for monitoring the weld resistance R and the electrical power P supplied to the weld and obtaining digital representations of the functions R and P, and digital computer means for storing the digital representations, said computer means being programmed to:
 (a) calculate the rate of change of resistance R and divide by power P to obtain the time varying function R/P representing the inverse specific heat of the weld,
 (b) search the resistance function R subsequent to an initial increase of resistance to identify where its maximum value $R_{peak}$ occurs, disregarding any maximum occurring at the end of a pulse if the resistance is still rising at the end of the pulse,
 (c) search the function R/P prior to the occurrence of $R_{peak}$ to locate a maximum value representing the inverse specific heat for the weld at low temperature, and
 (d) search the function R/P subsequent to its maximum to determine when it reaches an empirically determined fraction of the maximum value which occurs upon an increase of specific heat accompanying the onset of workpiece melting, thereby identifying the time of the onset of melting.

* * * * *

UNITED STATES PATENT AND TRADEMARK OFFICE
CERTIFICATE OF CORRECTION

PATENT NO. : 4,503,311

DATED : March 5, 1985

INVENTOR(S) : Albert F. Houchens, Basil A. Decina, Jr.
James R. Havens, Dixon Cleveland, Gregory L. Nagel It is certified that error appears in the above-identified patent and that said Letters Patent is hereby corrected as shown below:

IN THE ABSTRACT, line 5, "R" should read -- $\dot{R}$ --.

Column 1, lines 6 and 11, "R/P" should read -- $\dot{R}/P$ --.

Specification

Column 1, line 11, "gravity" should read -- quality --.

Column 2, lines 42 and 44, "R and R" should read -- $\dot{R}$ and $\ddot{R}$ --

Column 3, line 23, "E(t) = $_0^T$P(t)dt." should read
-- $E(t) = \int_0^T P(t)dt.$ --.

Column 4, line 33, "directcurrent" should read
-- direct- current --.

Column 6, line 1, "R/P" should read -- $\dot{R}/P$ --.

Column 6, lines 2 and 6, "R" should read -- $\dot{R}$ --.

Column 6, lines 7, 9, 11 and 13, "R/P" should read
-- $\dot{R}/P$ --.

Column 6, lines 19, 32, 37, 45, 47 and 50, "R/P" should read -- $\dot{R}/P$ --.

Column 6, line 64, "R/P" should read -- $\dot{R}/P$ --.

Column 7, lines 40 and 43, "R/P" should read -- $\dot{R}/P$ --.

Column 7, lines 60, 63 and 65, "R/P" should read
-- $\dot{R}/P$ --.

Column 9, line 1, delete "(for single pulse welds).".

UNITED STATES PATENT AND TRADEMARK OFFICE
CERTIFICATE OF CORRECTION

PATENT NO. : 4,503,311

DATED : March 5, 1985

INVENTOR(S) : Albert F. Houchens, Basil A. Decina, Jr. James R. Havens, Dixon Cleveland, Gregory L. Nagel It is certified that error appears in the above-identified patent and that said Letters Patent is hereby corrected as shown below:

Column 10, line 2, "R" should read -- $\dot{R}$ --.

Column 10, line 2, "R/P" should read -- $\dot{R}/P$ --.

Column 10, lines 44 and 45, "R" should read -- $\dot{R}$ --.

Column 10, lines 53, "R" should read -- $\dot{R}$ --.

Column 11, lines 47, 48 and 50, "R" should read -- $\dot{R}$ --.

Column 11, line 53, "R" should read -- $\dddot{R}$ --.

Column 11, line 54, "R" should read -- $\dot{R}$ --.

Column 11, line 56, "$X_I = R/R_{max}$" should read -- $X_I = \dddot{R}/\dddot{R}_{max}$ --.

Insert computer program between pages 23 and 24.

In the Claims

Claim 1, column 12, line 26, "R" should read -- $\dot{R}$ --.

Claim 2, column 12, lines 38, 40 and 42, "R/P" should read -- $\dot{R}/P$ --.

Claim 2, column 12, line 54, "R" should read -- $\dot{R}$ --.

Claim 2, column 12, lines 56, 61 and 65, "R/P" should read -- $\dot{R}/P$ --.

UNITED STATES PATENT AND TRADEMARK OFFICE
CERTIFICATE OF CORRECTION

PATENT NO. : 4,503,311

DATED : March 5, 1985

INVENTOR(S) : Albert F. Houchens, Basil A. Decina, Jr.
James R. Havens, Dixon Cleveland, Gregory L. Nagel It is certified that error appears in the above-identified patent and that said Letters Patent is hereby corrected as shown below:

Claim 3, column 13, lines 10 and 12, "R" should read -- $\dot{R}$ --.

Claim 3, column 13, lines 19 and 24, "R/P should read -- $\dot{R}/P$ --.

Claim 6, column 14, lines 30 and 31, "R" should read -- $\dot{R}$ --.

Claim 6, column 14, line 38, "R/P" should read -- $\dot{R}/P$ --.

Claim 6, column 14, line 42, "R/P" should read -- $\dot{R}/P$ --.

Signed and Sealed this

Fifteenth Day of October 1985

[SEAL]

Attest:

Attesting Officer

DONALD J. QUIGG

Commissioner of Patents and Trademarks—Designate